United States Patent [19]

Hansen et al.

[11] Patent Number: 5,173,558
[45] Date of Patent: Dec. 22, 1992

[54] BASE CATALYZED PREPARATION OF POLYORGANOSILOXANES WITH CONTROLLED LOW LEVELS OF HYDROXY SUBSTITUTION

[75] Inventors: Sidney A. Hansen, Beaverton; Charles E. Neal, Jr., Midland, both of Mich.

[73] Assignee: Dow Corning Corporation, Midland, Mich.

[21] Appl. No.: 900,800

[22] Filed: Jun. 22, 1992

Related U.S. Application Data

[63] Continuation-in-part of Ser. No. 702,485, May 20, 1991, abandoned.

[51] Int. Cl.$^5$ ............................................. C08G 77/06
[52] U.S. Cl. .................................... 528/14; 528/21; 528/23; 528/33; 556/450; 556/462
[58] Field of Search ................ 528/14, 21, 23, 33

[56] References Cited

U.S. PATENT DOCUMENTS

| | | | |
|---|---|---|---|
| 4,128,568 | 12/1978 | Buchner | 260/448.2 F |
| 4,250,290 | 2/1981 | Petersen | 528/14 |
| 4,439,592 | 3/1984 | Maass et al. | 528/14 |
| 4,551,515 | 11/1985 | Herberg et al. | 528/18 |
| 4,739,026 | 4/1988 | Riederer et al. | 528/33 |
| 4,780,519 | 10/1988 | Saam et al. | 528/14 |
| 4,792,596 | 12/1988 | Ottlinger et al. | 528/14 |

OTHER PUBLICATIONS

Voronkov et al., The Siloxane Bond, Consultants Bureau, NY, 1978, pp. 159-198.

*Primary Examiner*—John C. Bleutge
*Assistant Examiner*—Margaret W. Glen
*Attorney, Agent, or Firm*—William F. Boley

[57] ABSTRACT

The described process uses a Lewis base as a catalyst to effect the condensation of hydroxy end-substituted polyorganosiloxanes, in the presence of triorganosilyl endblocker to control polymer chain length. The inventors have discovered that within a base catalyst concentration range where the cation concentration is about $1 \times 10^{-3}$ to $2 \times 10^{-1}$ mole percent in relation to the silicon atoms present, the partial pressure of water can be controlled at a constant value to produce polyorganosiloxane polymers with a reproducible and predictable level of hydroxy substitution.

17 Claims, 1 Drawing Sheet

BASE CATALYZED PREPARATION OF POLYORGANOSILOXANES WITH CONTROLLED LOW LEVELS OF HYDROXY SUBSTITUTION

This is a continuation-in-part of copending application Ser. No. 07/702,485 filed on May 20, 1991, now abandoned.

BACKGROUND OF THE INVENTION

The present invention relates to a base catalyzed process for preparing polyorganosiloxane polymers with controlled low-levels of hydroxy substitution. Residual hydroxyl radicals substituted on polyorganosiloxane polymers provide reactive sites on the polymer chain that can cause polymer chain extension. This polymer chain extension results in viscosity shifts of the fluid and consequently reduced shelf life. In addition, the presence of these residual reactive sites are important to the physical characteristics and performance of the final product. Therefore, it is not only important that hydroxy substitution be low on polyorganosiloxane polymers, it is also important to be able to control the level of these reactive sites within specified limits.

Current production of polyorganosiloxane polymers, for example, polydimethylsiloxane, is a multi-step process. In a typical process, a first step involves hydrolyzing dimethyldichlorosilane and subsequent condensation of the hydrolysate to form an equilibrium mixture of low molecular weight permethylcyclosiloxanes and low molecular weight dimethylsiloxane linears. This condensation product is exhaustively washed to hydrolyze and remove chloride from the polymer. The wash is necessary to provide acceptably low levels of chloride in the final product.

The condensation products, free from chloride, are then run through a polymerization process to create high molecular weight polydimethylsiloxane fluids. Current processes require highly elevated temperatures and accordingly special equipment to run the processes. Considerable variability is experienced in the residual amount of hydroxy substitution of the polydimethylsiloxane fluid.

Therefore, it is an objective of the present invention to provide a polyorganosiloxane fluid with low-levels of hydroxy substitution. A second objective is to provide a process whereby the level of hydroxy substitution of the product polyorganosiloxane fluid can be controlled. A third objective is to provide a process whereby out of specification, polyorganosiloxane fluids can be re-processed with minimal detrimental alterations of the fluid.

Prior publications teach that bases can be used to catalyze the condensation reaction of low molecular weight polyorganosiloxanes and that water can be used to regulate the chain length of the polymer. However, the processes taught in the prior publications do not address the control of hydroxy substitution and generally resulted in polyorganosiloxane fluids with high residual levels of hydroxy substitution.

Voronkov et al., The Siloxane Bond, Consultants Bureau, New York, 1978, page 159/198, discusses possible base catalysts in polymerization of cyclic polyorganosiloxanes. These base catalysts include any Group IA alkali metal hydroxides such as lithium hydroxide, sodium hydroxide, cesium hydroxide, and potassium hydroxide; alcoholates, phenolates, silanolates, siloxanolates, and mercaptides of the Group IA alkali metals; quaternary ammonium and quaternary phosphonium bases and their siloxanolates; organolithium, organosodium, and organopotassium compounds; compounds of general formula RM, where R is a hydrocarbon radical, and M is an alkali metal atom: $R_4N^+$, and $R_4P^+$, where R is as previously described. Voronokov et al. teaches that chain length and of influencing the activity of some of the base catalysts. water can be used as a source of controlling the polymer U.S. Pat. No. 4,250,290, issued Feb. 10, 1981, discloses a process for the continuous manufacturing of diorganopolysiloxanes wherein it is possible to control the chain length by adding an appropriate amount of water as an endblocker. The viscosity of the polymer is monitored to determine the amount of water to be added to the reactor. A suitable base catalyst is used to facilitate the polymerization process; the base catalyst is selected from a group consisting of cesium hydroxide, potassium hydroxide, sodium hydroxide, cesium silanolate, potassium silanolate, and sodium silanolate. The polydiorganosiloxane products are described as silanol terminated. Peterson also claims the continuous polymerization of triorganosilyldiorganopolysiloxane polymers as a similar process, utilizing a low molecular weight triorganosilyldiorganopolysiloxane as a chain stopper in the absence of water.

Buchner et al., U.S. Pat. No. 4,128,568, issued Dec. 5, 1978, discusses a process for the continuous preparation of polydiorganosiloxanes with viscosities of 10 to several million centipoise, wherein an endblocker is used to regulate the viscosity of the product polymer, and the polymerization is facilitated by either an acid or base catalyst. Buchner reports using short-chained polydimethylsiloxanes as endblocker to control the viscosity of the product polymer.

Herberg et al.. U.S. Pat. No. 4,551,515, issued Nov. 5, 1985, discloses a process for the continuous manufacturing of silicon polymer, including high viscosity silicon polymers known as silicon gums. One or more cyclopolysiloxane monomers are mixed with one or more endblockers and preheated prior to the addition of a catalyst for facilitating the polymerization reaction. Endblockers and base catalysts described by Herberg et al. are previously disclosed by Peterson. Water is reported to terminate or endblock polydiorganosiloxane polymer with silanol groups and thus reduce the viscosity of the polymer and change its chemical nature; it is therefore removed from the reactants.

Hansen et al., co-pending U.S. patent application No. 612,655, filed Nov. 14. 1990, describes a process by which hydrogen chloride catalyzes the condensation of chloride and hydroxy end-substituted polyorganosiloxanes, in the presence of a triorganosilyl endblocker for controlling the polymer chain length. The hydrogen chloride concentration is varied within a range of about 10 to 30 weight percent to control the level of hydroxy substitution of product polyorganosiloxanes.

The inventors have discovered that by using triorganosilyl groups as endblocker to control polymer length during the base catalyzed condensation of polyorganosiloxanes, the partial pressure of water and temperature of the process can be varied within defined ranges to control the level of hydroxy substitution on the ends of polyorganosiloxane polymers.

The low-hydroxy substituted polyorganosiloxanes formed by the present method are useful, for example, as antiflatulents, antifoam compounds, and as intermediates in the formulation of sealants. The ability to control the level of hydroxy substitution, even when present at low levels, is important in producing stable formulations and formulations with predictable chemical reactivity.

SUMMARY OF INVENTION

The described process uses a Lewis base as a catalyst to effect the condensation of hydroxy end-substituted polyorganosiloxanes, in the presence of triorganosilyl endblocker to control chain length. The inventors have discovered that within a base catalyst concentration range where the cation concentration is about $1 \times 10^{-3}$ to $2 \times 10^{-1}$ mole percent in relation to the silicon atoms present, the partial pressure of water can be controlled at a constant value to produce polyorganosiloxane polymers with a reproducible and predictable level of hydroxy substitution.

DESCRIPTION OF THE INVENTION

Figure 1:
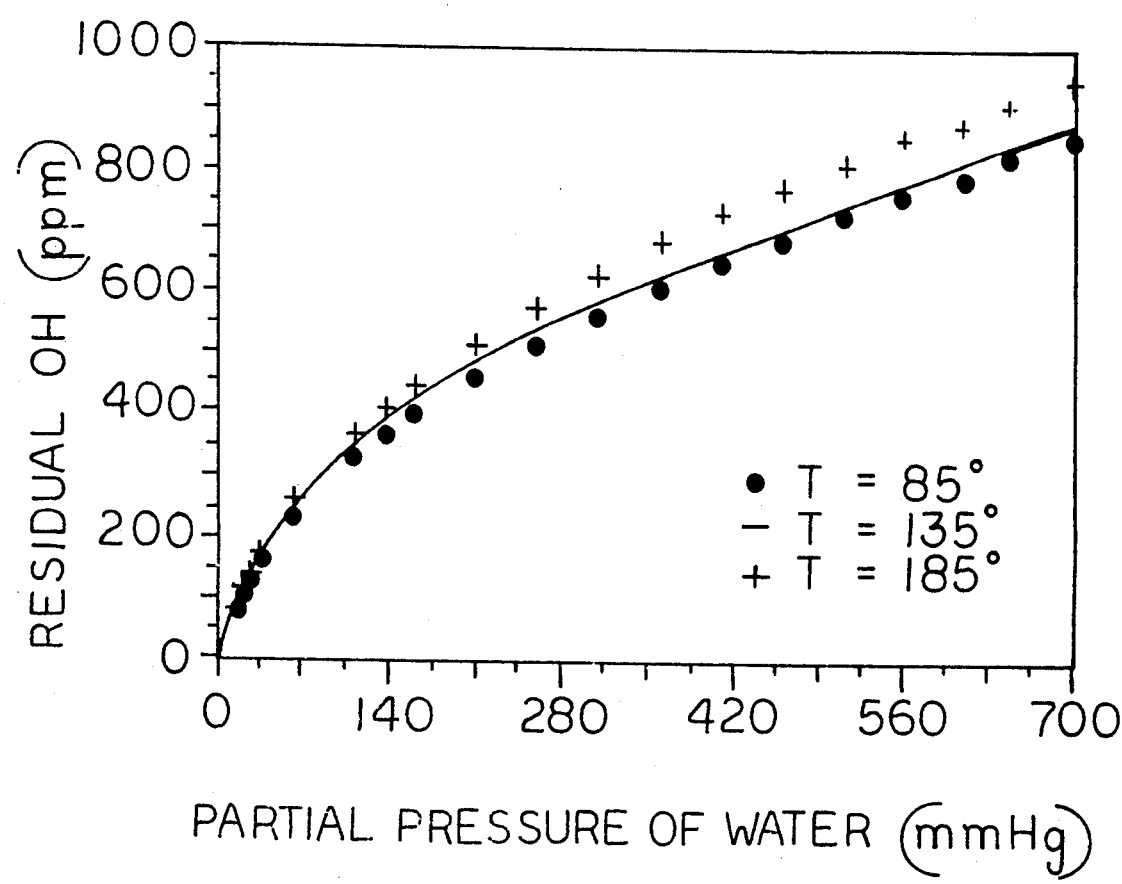
FIG. 1 illustrates the expected increase in hydroxy substitution with increased partial pressure of water.

As previously noted, the base catalyzed condensation of polyorganosiloxanes is known. However, the previously known base catalyzed processes produce polyorganosiloxanes with unpredictable variations in the levels of hydroxy substitution in the final product. Therefore, quite unexpectedly, the inventors have discovered a base catalyzed process in which polyorganosiloxanes can easily be produced with predictable and consistent low-levels of hydroxy substitution. This control of hydroxy substitution is achieved by regulating the partial pressure of water. Polymer length is controlled independently by the presence of triorganosilyl endblocker.

Therefore, what is claimed is a process for preparing polyorganosiloxanes containing a controlled low-level of hydroxy substitution, the process comprising:

(A) contacting a mixture comprising low molecular weight polyorganosiloxanes of formula

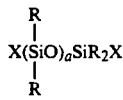

and a source of triorganosilyl endblocker of formula

with a Lewis base catalyst: where each X is independently selected from a group consisting of cations of the Lewis base catalyst and hydroxyl radicals; each R is independently selected from a group consisting of monovalent hydrocarbon radicals of one to six carbon atoms and 1,1,1-trifluoropropyl radical; each $R^1$ is independently selected from a group consisting of hydrocarbon radicals of one to six carbon atoms and 1,1,1-trifluoropropyl radical; and a is an average value of one to about 2,000;

(B) controlling partial pressure of water in the process at a constant value within a range of about zero to 1,000 mmHg;

(C) controlling temperature of the contacted mixture and Lewis base catalyst at a value within a range of $-40°$ C. to $300°$ C.; and (D) recovering product polyorganosiloxanes of formula

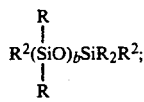

where the product polyorganosiloxanes have a potential value for hydroxy substitution within a range of about zero to 1,000 ppm; where R is as previously described and $R^2$ is selected from a group consisting of $R^1$ and hydroxyl; and b is an average value within a range of a to about 2,000.

The described process requires contact between a liquid phase and a vapor phase in a suitable reactor. The liquid phase comprises the mixture of low molecular weight polyorganosiloxanes and triorganosilyl endblocker source, base catalyst, and product polyorganosiloxanes. The vapor phase comprises the water and minor amounts of volatile polyorganosiloxanes. Control of the described process is facilitated by monitoring the partial pressure of water. Therefore, it is desirable that the partial pressure of water reflect that of a saturated liquid. This is facilitated by maintaining an equilibrium between the vapor and liquid phases to obtain liquid saturation. To ensure equilibrium conditions, interfacial contact between the liquid and vapor phases should be facilitated by a dispersive means that will provide an adequate dispersion of one of the phases in the other. Such dispersive means may be, for example, mechanical stirring, sonification, agitation of the reactor, high pressure injection, or impingement mixing.

The reactor employed in the instant process can be any standard reactor for maintaining equilibrium between vapor and liquid phases. The process can be conducted, for example, in a single batch reactor or a series of batch reactors; a single continuous-flow stirred-tank (CSTR) reactor or a series of CSTR reactors. Preferred, is when the process is conducted in a single batch reactor that is capable of being maintained as a closed system so that the partial pressure of water can be accurately measured and easily controlled.

The proportion of the polyorganosiloxane containing liquid phase to the vapor phase is not critical to the described process. In general, the process can be satisfactorily run where the vapor phase constitutes, by volume, about one to 90 percent of the dispersion. Preferred, is when the vapor phase constitutes, by volume, about five to 30 percent of the dispersion.

The low molecular weight polyorganosiloxanes which can be condensed by the instant process contain on each end either a cation of the Lewis base catalyst or a hydroxyl radical. The preferred cation for the Lewis base catalyst is potassium.

The low molecular weight polyorganosiloxanes may be a monodispersed polyorganosiloxane, in which case a can be an integer from one to 2,000. The low molecular weight polyorganosiloxanes can be a polydispersed mixture, in which case a is an average value for the number of siloxane units in a range of one to 2,000. Preferred, is a polydispersed mixture of polyorganosiloxanes where a is an average value of one to 100. Most preferred, is a polydispersed mixture of low molecular weight polyorganosiloxanes where a is an average value of one to 50. The organic portion of the low molecular weight polyorganosiloxanes, R, is selected from a group consisting of hydrocarbon radicals of one to six carbon atoms and 1,1,1-trifluoropropyl radical. Each R can be independently chosen from the described group. The hydrocarbon radical can be, for example, an alkyl, alkenyl, or aryl radical. The hydrocarbon radical can be, for example, methyl, ethyl, propyl, isopropyl, n-butyl, isobutyl, tert-butyl, sec-butyl, pentyl, hexyl, vinyl, amyl, hexenyl, and phenyl. Preferred, is when all the R groups are methyl.

By effective Lewis base catalyst is meant, a substance containing unshared electron pairs, that can facilitate the condensation reaction of low molecular weight polyorganosiloxanes to form higher molecular weight product polyorganosiloxanes. The Lewis base catalyst can be, for example, hydroxides, alcoholates, silanolates, siloxanolates, or mercaptides of the Group IA alkali metals; quaternary ammonium and quaternary phosphonium bases or their siloxanolates; organosodium, organolithium, or organopotassium compounds, hydrocarbon compounds of general formula $R^3M$, where $R^3$ is a hydrocarbon radical of one to 25 carbon atoms, and M is a Group IA alkali metal atom; organic nitrogen compounds of formula $R^3_4N^+$, or organic phosphorous compounds of formula $R^3_4P^+$, where $R^3$ is as previously described.

The Lewis base catalyst can be, for example, lithium hydroxide, sodium hydroxide, cesium hydroxide, or potassium hydroxide; lithium alcoholate, sodium alcoholate, cesium alcoholate, or potassium alcoholate; lithium phenolate, sodium phenolate, cesium phenolate, or potassium phenolate; lithium silanolate, sodium silanolate, cesium silanolate, or potassium silanolate; lithium siloxanolate, sodium siloxanolate, cesium siloxanolate, or potassium siloxanolate; lithium mercaptide, sodium mercaptide, or potassium mercaptide; tetramethylammonium siloxanolate or tetrabutylphosphonium siloxanolate; or a sodium derivative of naphthalene.

Preferred, is when the Lewis base catalyst is a Group IA alkali metal silanolate, an active form of the Group IA alkali metal hydroxide. Most preferred, is when the Lewis base catalyst is potassium silanolate.

An effective concentration of the Lewis base catalyst will depend upon the particular catalyst employed. In general, an effective concentration of the Lewis base provides a cation concentration within a range of about $1\times10^{-3}$ to $2\times10^{-1}$ mole percent, in relation to the silicon atoms present in the initial feed to the process. Preferred is when the cation is present at a concentration of about $2\times10^{-3}$ to $2\times10^{-1}$ mole percent.

The inventors have found that the concentration of hydroxy substitution present in the final product is a function of the partial pressure of water present during conduct of the process.

Further, the inventors have discovered that the relationship between the partial pressure of water, the process temperature, and the residual hydroxy substitution can be predicted by the following equation and constants:

$$[OH] = \frac{K^1_E (P_{H2O})^{\frac{1}{2}}}{T} \quad (1)$$

Where:

$K^1_E$ = 8,461 ± 4607 @ 358 K. (85° C.)
= 13,701 ± 2253 @ 408 K. (135° C.)
= 17,033 ± 729 @ 458 K. (185° C.)
[OH] = ppm OH by weight
$P_{H2O}$ = mmHg
$T$ = degree Kelvin Predicted values, based upon equation (1), for residual hydroxy substitution on product polyorganosiloxanes are presented in FIG. 1. FIG. 1 illustrates the expected increase in hydroxy substitution with increased partial pressure of water.

Therefore, based upon these calculations and the examples offered herein, the inventors claim a process wherein the partial pressure of water is controlled at a constant value within a range of about zero to 1,000 mmHg. The upper limit for the partial pressure of water is dictated by the desired limit for hydroxy substitution on the product polyorganosiloxanes. In a preferred process, the partial pressure of water is maintained at a constant value within a range of about zero to 500 mmHg. The most preferred partial pressure for water is a constant value within a range of 30 to 200 mmHg. By "constant value" it is meant that the partial pressure of water is controlled within about plus or minus ten percent of a desired value.

The information presented in FIG. 1 also predicts temperature to be an important parameter in determining the hydroxy substitution of the product polyorganosiloxanes. To maintain the hydroxy substitution of the product polyorganosiloxanes in the desired range of about zero to 1,000 ppm, the temperature is controlled at a value within a range of −40° C. to 300° C. Preferred, is when the temperature is controlled at a value within a range of 10° C. to 250° C. Even more preferred, is when the temperature is controlled within a range of 25° C. to 200° C. It is preferred the temperature be controlled above the dew point of water, thereby allowing the partial pressure of water to be controlled by the volume of water added. The temperature can be controlled by standard means, for example, a fluidized sand bath, a water or solvent bath, heating mantle, or forced air.

Control of polymer length of product polyorganosiloxanes is effected by the presence of a source of triorganosilyl endblocker groups as a mixture with the low molecular weight polyorganosiloxanes. The source of triorganosilyl endblocker groups can be any material which under reaction conditions provides triorganosilyl groups of formula $R^1_3Si-$, where $R^1$ is a hydrocarbon radical of one to six carbon atoms. $R^1$ can be, for example, an alkyl, alkenyl, or aryl radical. $R^1$ can be, for example, methyl, ethyl, propyl, isopropyl, n-butyl, isobutyl, tert-butyl, sec-butyl, pentyl, hexyl, vinyl, amyl, hexenyl, and phenyl. Preferred, is when all the $R^1$ radicals are methyl.

The source of the triorganosilyl groups can be, for example, hexamethyldisiloxane or low molecular weight trimethylsilyl endblocked polydimethysiloxanes. Preferred, is when the triorganosilyl groups originate from hexamethyldisiloxane. A useful concentration of available triorganosilyl groups is about 0.1 to 25 weight percent of the mixture, based upon $R^1_3Si-$ weight, where $R^1_3Si-$ is as previously described. A preferred concentration of available triorganosilyl groups is about 0.1 to 5 weight percent of the mixture. Typical equilibrium times for the described process are in a range of 15 to 60 minutes, as compared to an equilibrium time of one to 10 hours set by the siloxane rearrangement rate to form long-chain siloxanes, in the absence of the triorganosilyl endblocker. The equilibrium time for the described process is also dependent upon the interfacial contact between the gas and liquid phases. The greater the contact area, the faster the process will reach equilibrium.

Recovery of product polyorganosiloxanes can be accomplished by standard means for neutralization of the Lewis base catalyst and separation of aqueous and organic phases. Neutralizing can be accomplished by using mild acids such as phosphoric acid, tris(chloroethyl)-phosphite, silyl phosphate; or by addition of a chlorosilane, for example, trimethylchlorosilane. Preferred, is when silyl phosphate is the neutralizing agent. The neutralized product polyorganosiloxanes can be separated from the aqueous phase by stripping, gravitational settling, or centrifugation. Product polyorganosiloxanes are recovered for further processing as required.

The recovered product polyorganosiloxanes comprise as a major component entirely organic substituted polysiloxane chains and as a minor component organic substituted polysiloxane chains with an end-terminal hydroxy substitution. The claimed process controls the potential average value for end-terminal hydroxyl groups within a range of about zero to 1,000 ppm.

The product polyorganosiloxanes comprise a mixture of polyorganosiloxanes of varying chain lengths. The average value for the number of siloxane units, $-SiR_2O-$, per chain, is expressed as the value b. The value b is restricted to an average value within a range having a lower limit equal to or greater than a and an upper limit of about 2,000.

The organic substituent, R, of the product polyorganosiloxanes is as previously described for the low molecular weight polyorganosiloxanes. The product polyorganosiloxanes also have a substituent $R^2$, which is selected from a group consisting of $R^1$ and hydroxyl radical. Preferred, is where $R^2$ is selected from a group consisting of a methyl and hydroxyl radicals.

Typically, the recovered product polyorganosiloxanes undergo a wash step to replace residual Lewis base cation substituted on the polymer, with hydroxy radical. Thus, the final potential concentration of hydroxy substitution on the polyorganosiloxanes is the total of the hydroxy substitution and Lewis base cation substitution present on the product polyorganosiloxanes after the condensation reaction.

The product polyorganosiloxanes of the described process typically go through a stripping procedure to remove cyclic polyorganosiloxanes and low molecular weight polyorganosiloxane linears. These cyclic and low molecular weight linear materials may be recycled to the described condensation process. It has been found that the equilibrium concentration of cyclics in a polyorganosiloxane fluid, prepared by the described condensation process, is about twelve weight percent. Therefore, stripped cyclics fed to the reactor in excess of the equilibrium amount can be rearranged into desired product polyorganosiloxanes.

The following examples are offered as illustrative of the described process. These examples are not intended to limit the scope of the described invention. For the examples, all parts are by weight unless otherwise indicated.

EXAMPLE 1

The effects of the partial pressure of water on residual hydroxy concentration of product polydiorganosiloxanes formed by base catalyzed condensation was evaluated. The condensation reaction was conducted in the presence of a triorganosilyl endblocker source to control polymer length.

The reactor for conducting the process was an insulated 2500-ml equilibrium cell equipped with a metal jacket through which a heating fluid could be passed to provide heat to the reactor. The reactor was capable of being maintained as a closed system so that accurate measurements of the partial pressure of water could be obtained. A turbine blade agitator, with a hollow shaft to draw the vapor head space into the liquid, was used to ensure adequate interchange between the gas and liquid phases.

Approximately 1.5 liter of cyclic polydimethylsiloxane (>98% cyclic tetramer) and 70.2 ml of short-chained trimethylsilyl end-blocked polydimethylsiloxane as a source of trimethylsilyl endblocker were added to the reactor. The reactants were heated to a temperature of about 135° C. with the agitator running. The reactor was purged with dry nitrogen for about four hours to remove residual water. The temperature and pressure of the reactor were allowed to stabilize.

Under steady state temperature conditions, 14.4 ml of polydimethyl potassium silanolate catalyst, which made up 250 ppm by weight of potassium in the reactor, was injected through a sample port located in the wall of the reactor.

The temperature and pressure of the reactor were again allowed to stabilize, and the reactor was purged with nitrogen to remove residual water. Additions of water to the reactor and periodic drying of the reactor with a nitrogen purge were conducted as presented in Table 1. At about six to 18 hours after purging and/or addition of water, a sample was withdrawn from the reactor and analyzed by Fourier Transform Infrared (FTIR) analysis for hydroxy content of the polydimethylsiloxanes.

The results are presented in Table 1. The heading "Water Injected" indicates the milliliters of water injected into the reactor before a particular sampling. The "Purge/Dry" label under the "Water Injected" heading indicates the reactor was purged with nitrogen to remove residual water and to drive the hydroxy content of the polydimethylsiloxanes to near zero. The "$P_{H2O}$" heading denotes the partial pressure of water in the reactor. The "Silanol" heading denotes the concentration of hydroxyl (—OH) in relation to the weight of polydimethylsiloxane products.

TABLE 1

Effects of the Partial Pressure of Water on Hydroxy Substitution of Polydimethylsiloxanes at 135° C.

| Water Injected (ml) | $P_{H2O}$ (mmHg) | Silanol (ppm OH) |
|---|---|---|
| 2.45 | 315 | 736 |
| Purge/Dry | | |
| 0.39 | 81 | 167 |
| 1.80 | 226 | 467 |
| 0.91 | 409 | 721 |
| Purge/Dry | | |
| 0.07 | 68 | 159 |

TABLE 1-continued

Effects of the Partial Pressure of Water on
Hydroxy Substitution of Polydimethylsiloxanes
at 135° C.

| Water Injected (ml) | $P_{H2O}$ (mmHg) | Silanol (ppm OH) |
| --- | --- | --- |
| 2.10 | 355 | 604 |

The data presented in Table 1, demonstrate that the residual hydroxy concentration of polydimethylsiloxanes can be controlled by the partial pressure of water, in the presence of a base catalyst. Furthermore, since the partial pressure of water can be controlled by introducing or withdrawing water from the reactor, the level of hydroxy substitution on product polydimethylsiloxanes is reversible.

EXAMPLE 2

The relationship of the partial pressure of water to residual hydroxy concentration of product polydimethylsiloxanes was evaluated at 185° C. The reactor and procedure were similar to that described in Example 1.

Approximately 1.5 liters of cyclic polydimethylsiloxane (>98% cyclic tetramer) and 70.2 ml of short-chained trimethylsilyl end-blocked polydimethylsiloxane, as endblocker, were added to the reactor. The reactor and reactants were heated to 185° C. with the agitator running. The reactor was purged with dry nitrogen for about four hours to remove residual water. The temperature and pressure of the reactor were allowed to stabilize.

Under steady state temperature conditions, 0.58 ml of polydimethyl potassium silanolate catalyst, which made up 10 ppm by weight of potassium in the reactor, was injected through the sample port of the reactor.

The reactor was purged with nitrogen and the temperature and pressure of the reactor were allowed to stabilize. Measured amounts of water as reported in Table 2, were then added stepwise to the reactor through the sample port. At about six to 18 hours after each addition of water, a sample was withdrawn from the reactor and analyzed by FTIR analysis for hydroxy content of the product polydimethylsiloxanes.

The results are presented in Table 2. The headings in Table 2 are as previously described for Table 1.

TABLE 2

Effects of the Partial Pressure of Water
on Hydroxy Substitution of Polydimethylsiloxanes
at 185° C.

| Water Injected (ml) | $P_{H2O}$ (mmHg) | Silanol (ppm OH) |
| --- | --- | --- |
| 0.04 | 10 | 114 |
| 0.73 | 162 | 458 |
| 0.69 | 331 | 688 |

EXAMPLE 3

The relationship of the partial pressure of water to residual hydroxy concentration of product polydimethylsiloxanes was evaluated at 85° C. The reactor and procedure were similar to that described in Example 1.

Approximately 1.5 liters of cyclic polydimethylsiloxane (>98% cyclic tetramer) and 70.2 ml of short-chained trimethylsilyl end-blocked polydimethylsiloxane endblocker were added to the reactor. The reactants were heated to 85° C. with the agitator running. The reactor was purged with dry nitrogen for about four hours to remove residual water. The temperature and pressure of the reactor were allowed to stabilize.

Under steady state temperature conditions. 57.5 ml of polydimethyl potassium silanolate catalyst, which made up 1,000 ppm by weight of potassium in the reactor, was injected through the sample port of the reactor.

The reactor was purged with nitrogen and the temperature and pressure of the reactor were allowed to stabilize. Measured amounts of water, as reported in Table 3, were then added stepwise to the reactor through the sample port. Second phase water was observed in this sample, as evidenced by a cloudy appearance of the sample. Thus, the addition of water did not result in a stepwise increase in water partial pressure and silanol concentration as observed in Examples 1 and 2. At about six to 18 hours after each addition of water, a sample was withdrawn from the reactor and analyzed by FTIR analysis for hydroxy content of the polydimethylsiloxanes.

The results are presented in Table 3. The headings in Table 3 are as previously described for Table 1.

TABLE 3

Effects of the Partial Pressure of Water
on Hydroxy Substitution of Polydimethylsiloxanes
at 85° C.

| Water Injected (ml) | $P_{H2O}$ (mmHg) | Silanol (ppm OH) |
| --- | --- | --- |
| 14.9 | 201 | 303 |
| 29.1 | 341 | 338 |

What is claimed is:

1. A process for preparing polyorganosiloxanes containing a controlled low-level of hydroxy substitution, the process comprising:

(A) contacting a mixture comprising low molecular weight polyorganosiloxanes of formula

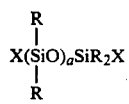

and a source of triorganosilyl endblocker of formula

with a Lewis base catalyst; where each X is independently selected from a group consisting of cations of the Lewis base catalyst and hydroxyl radicals; each R is independently selected from a group consisting of monovalent hydrocarbon radicals of one to six carbon atoms and 1,1,1-trifluoropropyl radical; each $R^1$ is independently selected from a group consisting of hydrocarbon radicals of one to six carbon atoms and 1,1,1-trifluoropropyl radical; and a is an average value of one to about 2,000;

(B) controlling partial pressure of water in the process at a constant value within a range of about zero to 1,000 mmHg.

(C) controlling temperature of the contacted mixtures and Lewis base catalyst at a value within a range of 40° C. to 300° C.; and (D) recovering product polyorganosiloxanes of formula

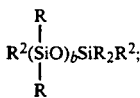

where the product polyorganosiloxanes have a potential value for hydroxy substitution within a range of about zero to 1,000 ppm; where R is as previously described and $R_2$ is selected from a group consisting of $R_1$ and hydroxyl; and b is an average value within a range of a to about 2,000.

2. A process according to claim 1, where the source of triorganosilyl endblocker is selected from a group consisting of hexamethyldisiloxane and trimethylsilyl endblocked polydimethylsiloxanes.

3. A process according to claim 2, where the source of triorganosilyl endblocker is hexamethyldisiloxane.

4. A process according claim 1, where the available triorganosilyl endblocker groups are present at a concentration of about 0.1 to 5 weight percent of the mixture.

5. A process according to claim 1, where X is hydroxyl.

6. A process according to claim 1, where R is methyl.

7. A process according to claim 1, where the Lewis base catalyst s selected from a group consisting of hydroxides, alcoholates, silanolates, siloxanolates, and mercaptides of the Group IA alkali metals; quaternary ammonium and quaternary phosphonium bases and their siloxanolates; organosodium, organolithium, and organopotassium compounds; hydrocarbon compounds of general formula $R^3M$, where $R^3$ is a hydrocarbon radical of one to 25 carbon atoms, and M is a Group IA alkali metal atom; organic nitrogen compounds of formula $R^3{}_4N^+$, and organic phosphorous compounds of formula $R^3{}_4P^+$, where $R^3$ is as previously described.

8. A process according to claim 1, where the Lewis base catalyst is selected from a group consisting Group IA alkali metal hydroxides and Group IA alkali metal silanolates.

9. A process according to claim 1, where the Lewis base catalyst is potassium silanolate.

10. A process according to claim 1, where a is an average value within a range of one to 50.

11. A process according to claim 1, where the partial pressure of water is a constant value within a range of 30 to 200 mmHg.

12. A process according to claim 1, where the temperature is a value within a range of 25° C. to 200° C.

13. A process according to claim 1, where the product polyorganosiloxanes chain length is controlled by the triorganosilyl endblocker.

14. A process according to claim 1, where hydroxy substitution of product polyorganosiloxanes is controlled by controlling the partial pressure of water.

15. A process according to claim 1, where the concentration of the Lewis base catalyst provides a cation concentration within a range of about $1 \times 10^{-3}$ to $2 \times 10^{-1}$ mole percent, in relation to the silicon atoms present in initial feed to the process.

16. A process according to claim 1, where the recovering of product polyorganosiloxanes is accomplished by neutralization of the Lewis base catalyst and separation of the aqueous and organic phases.

17. A process according to claim 1, where X is hydroxyl and R is methyl; the Lewis base catalyst is potassium silanolate; the partial pressure of water is controlled at a constant value within a range of 30 to 200 mmHg; the temperature is a value within a range of 25° C. to 200° C.; and the recovered polyorganosiloxanes are neutralized to remove the potassium silanolate catalyst.

* * * * *